(12) United States Patent
Russo (10) Patent No.: US 6,710,713 B1
(45) Date of Patent: Mar. 23, 2004

(54) METHOD AND APPARATUS FOR EVALUATING ATHLETES IN COMPETITION

(75) Inventor: Gaetano Tom Russo, Mesa, AZ (US)

(73) Assignees: Tom Russo, Grands Rapids, MI (US); Patricia Scandling, Mesa, AZ (US)

(*) Notice: Subject to any disclaimer, the term of this patent is extended or adjusted under 35 U.S.C. 154(b) by 26 days.

(21) Appl. No.: 10/150,860

(22) Filed: May 17, 2002

(51) Int. Cl.[7] ............................................. G08B 23/00
(52) U.S. Cl. ........................ 340/573.1; 340/815.4; 348/157; 700/91
(58) Field of Search .................... 340/573.1, 815.4, 340/815.65, 323 R, 309.16; 348/157, 169; 700/91; 701/213; 702/182; 482/8, 9, 901, 902; 600/300

(56) References Cited

U.S. PATENT DOCUMENTS

| | | | |
|---|---|---|---|
| 3,846,704 A | 11/1974 | Bessette | 340/870.28 |
| 5,451,922 A | 9/1995 | Hamilton | 340/309.16 |
| 5,524,637 A | 6/1996 | Erickson | 482/8 X |
| 5,812,049 A | 9/1998 | Uzi | 340/323 R |
| 5,825,327 A | 10/1998 | Krasner | 342/357.09 |
| 6,002,982 A | * 12/1999 | Fry | 701/213 |
| 6,013,007 A | 1/2000 | Root et al. | 482/8 |
| 6,086,379 A | 7/2000 | Pendergast et al. | 434/254 |
| 6,141,041 A | * 10/2000 | Carlbom et al. | 348/169 |
| 6,148,262 A | 11/2000 | Fry | 701/213 |
| 6,308,565 B1 | 10/2001 | French et al. | 73/379.04 |
| 6,575,879 B1 | * 6/2003 | Harney et al. | 482/54 |

* cited by examiner

*Primary Examiner*—Thomas J Mullen
(74) *Attorney, Agent, or Firm*—Schmeiser, Olsen & Watts, LLP (57) ABSTRACT

The present invention provides a method and apparatus for tracking athletes during team competition, analyzing the performance of the athletes, and displaying motion picture images of the athletes along with selected measured and derived data about the motion of the athletes. In one embodiment, graphical icons representing movement parameters are superimposed upon the video images of a plurality of athletes during athletic play. In another embodiment, the motion data of a particular athlete are analyzed for a plurality of playing environments, including teammates and opponents, to determine the conditions under which the particular athlete excels or fails. In yet another embodiment, combinations of moving picture images of athletes and athlete motion data are provided to sports commentators for display to television audiences. In a particular embodiment, the images and data are provided to sports fans at locations remote from the game.

31 Claims, 7 Drawing Sheets

METHOD AND APPARATUS FOR EVALUATING ATHLETES IN COMPETITION

BACKGROUND OF THE INVENTION

1. Technical Field

This invention relates generally to systems for tracking, analyzing, and evaluating athletic performance in team sports and displaying the evaluation results and more specifically to evaluating the performance of multiple football players during actual competition.

2. Background

The performance of an individual athlete can be scientifically evaluated by analyzing the motion of the athlete in response to a defined stimulus. Given a particular stimulus, an athlete's responsive change of position over time can be measured by a tracking system. These measurements are useful for evaluating the performance of an athlete. Current systems derive velocity, acceleration, and response time from tracking system data. Some current systems use a computer-generated "virtual opponent" shown on a screen in a controlled manner to provide the stimulus. This allows precise knowledge of the timing and dynamics of the stimuli. After the stimulus is presented, the athlete's motion is tracked to measure the response.

A variety of tracking systems are currently available. Target tracking methods span spectrums between purely active tracking and purely passive tracking and between cooperative and uncooperative targets. The term "target" as defined and used herein refers to the person or thing sought to be tracked. For example, an athlete is a "target" for tracking purposes. Purely active tracking sends a signal into the space potentially containing a target and receives a return of the signal reflected by the target which is analyzed to determine target location. Radar of the World War II era is an example of purely active tracking. Purely passive methods rely on the target emitting a signal which a sensor can discriminate from the background. Infrared optical trackers may be purely passive trackers. A cooperative target is one that assists the tracker. For example, attachment of a corner reflector or an infrared beacon to the target would help, respectively, radars and infrared optical sensors to track the target.

For several purposes, it is desirable to track an athlete. The data relating to the motion of an athlete over time has been found useful in sports testing and training. Current known systems track a single athlete. U.S. Pat. No. 6,308,565 to French, et al., (Oct. 30, 2001) discloses a testing and training system that tracks a single athlete to evaluate his performance. French further discloses the use of commercially available tracking systems using optical sensors. French also discloses a game system "for determining changes in an overall physical location of the respective player in a respective defined physical space," which tracks physical movement of a player in a different ("respective") space and then puts the sum of all actions together in a virtual reality game. U.S. Pat. No. 6,148,262 to Fry (Nov. 14, 2000) discloses a performance tracking device using Global Positioning System (GPS) data in a personal computer that moves with the athlete for jogging, bicycling, and the like. U.S. Pat. No. 6,013,007 to Root, et al. (Jan. 11, 2000) discloses a personal athletic performance monitor that uses GPS data and is carried by the athlete. The athlete can later download the data into a computer for analysis. U.S. Pat. No. 5,812,049 to Uzi (Sep. 22, 1998) discloses a system for measuring the lap time of a swimmer at swimming meets, the system comprising a plurality of tracking systems each deployed in a lane. U.S. Pat. No. 5,825,327 to Krasner discloses garments containing GPS receivers. The focus of current systems is on individual athletic performance.

The methods known in the art do not meet all needs. Current systems are inadequate to evaluate how an athlete's performance varies depending on his head-to-head competitors and the athlete's own team members with whom he interacts directly during competition. For example, the performance of an offensive right guard on a football team may vary depending on who is playing offensive center and who is playing offensive right tackle because the actions of neighboring linemen must be coordinated to be effective. Likewise, the performance of the athlete who is playing defense opposite the offensive linemen of interest will affect the performance of the offensive linemen. Coaches, commentators, and fans would like to know what combination of players is the best match for a given combination of competitors. Current systems do not answer this question. Coaches must rely on experience and direct observation to analyze performance. The resulting analysis is necessarily highly subjective. The need for a way to objectively analyze player performance in competition is unmet.

Another unmet need is the need to visualize the dynamics of players in an actual, as opposed to simulated, competition. While video images of players in motion do provide a lot of information, it is desirable to enhance that information with actual dynamic measurements. While such measurements can currently be obtained in simulated laboratory settings, current systems are not readily adaptable to making dynamic measurements of athletes in actual competition. For example, the invention of French, supra, uses optical sensors tracking one athlete in a "respective space" containing only one athlete. French's system does not track a plurality of athletes in the same space, as is required for tracking during team competition. The optical sensors cannot keep the target in view when other player's interpose themselves between the sensor and the target.

SUMMARY OF THE INVENTION

Accordingly, the present invention provides a method and apparatus for tracking athlete's during team competition, analyzing the performance of the athletes, and displaying digital video images of the athletes along with selected measured and derived data about the motion of the athletes. In one embodiment, graphical icons representing movement parameters are superimposed upon the video images of a plurality of athletes during athletic play. In another embodiment, the motion data of a particular athlete are analyzed for a plurality of playing environments, including teammates and opponents, to determine the conditions under which the particular athlete excels or fails. In yet another embodiment, combinations of moving picture images of athletes and athlete motion data are provided to sports commentators for display to television audiences. In a particular embodiment, the images and data are provided to sports fans at remote locations.

BRIEF DESCRIPTION OF THE DRAWINGS

The foregoing and other features and advantages of the invention will be apparent from the following more particular description of specific embodiments of the invention, as illustrated in the accompanying drawings, wherein.

DETAILED DESCRIPTION OF EMBODIMENTS OF THE INVENTION

Figure 1:
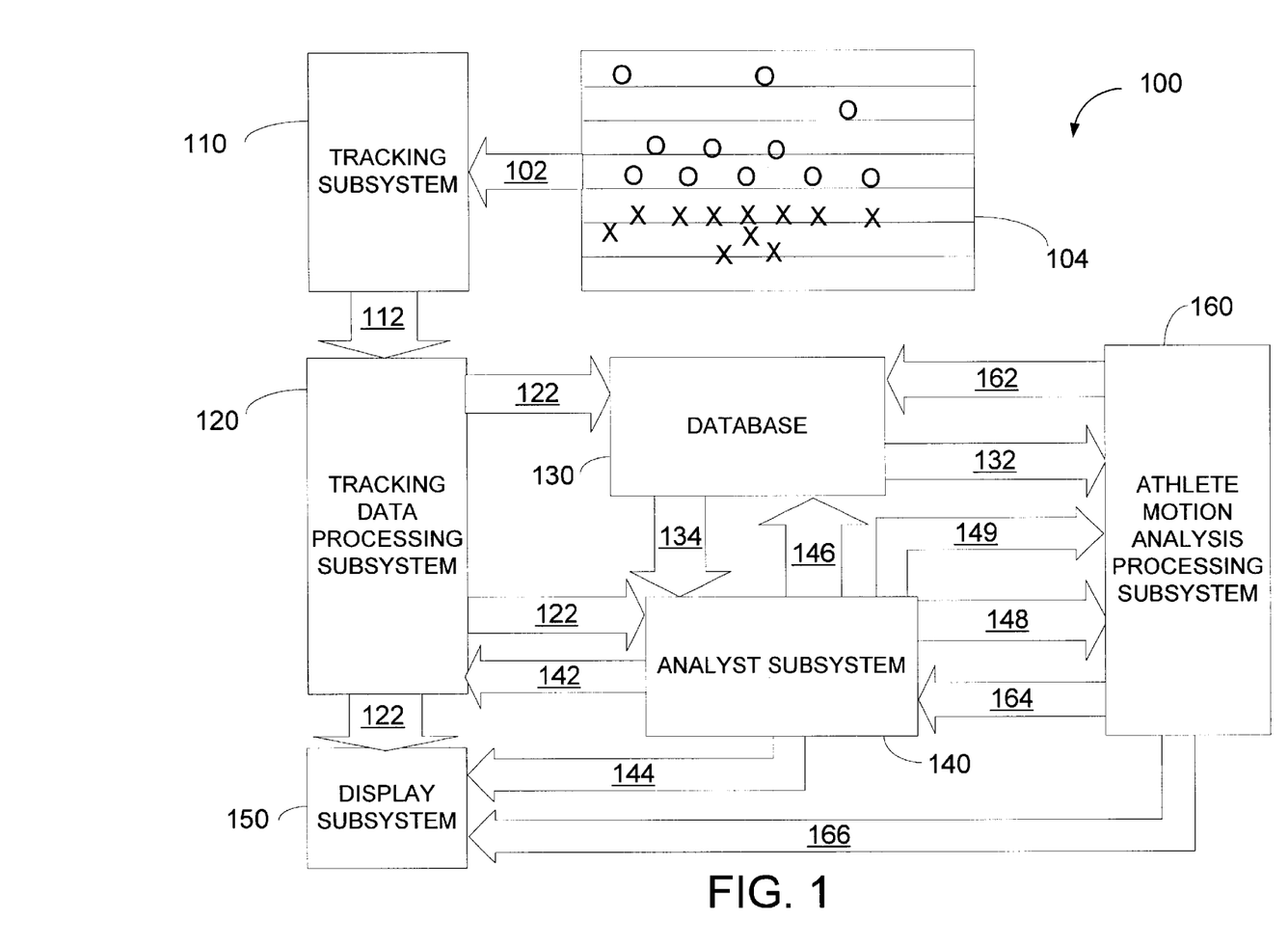
FIG. 1 is a system diagram of an exemplary embodiment of an athletic competition tracker.

Referring now to the figures, FIG. 1 shows a block diagram of an exemplary embodiment of an athletic competitive tracker 100 system. Tracking data 102 is generated as the players (represented by X's and O's) play a game on field 104. Tracking data 102 may be gathered by one of the tracking systems known in the art. The generation of the tracking data 102 may occur on the field 104 or elsewhere in the tracking subsystem 110. In an embodiment using a passive tracking subsystem 110, the tracking data 102 is collected in sensors and created in processors that are off the field 104. Tracking data comprises three spatial coordinates, time, and a unique athlete identifier. In most embodiments, the three spatial coordinates will be expressed in a right-handed Cartesian coordinate system, but other orthogonal coordinate systems will also serve. Non-orthogonal coordinate systems may also be used, but generally require additional coordinates. In an alternate embodiment, two position coordinates may be used for a game played on a flat field. In another alternate embodiment, one position coordinate may be used for a sport in which motion is confined to lanes.

In some embodiments, the tracking subsystem 110 comprises personal motion data collectors which move with the players. The personal motion data collectors may be part of the athlete's uniforms. In a particular embodiment, the personal motion data collector comprises at least one receiving antenna, at least one navigation receiver, at least one transmitter, and at least one transmitting antenna. Navigation receivers are known in the art. For example, Global Positioning System (GPS) receivers are a type of navigation receiver. A receiver operating on a principle similar to GPS (four-dimensional triangulation) but responsive to fixed local beacons instead of satellites is an example of another type of navigation receiver. Receivers responsive to local beacons working on three-dimensional or two-dimensional triangulation principles are also examples of navigation receivers.

The personal motion data collector may be packaged in a single discrete package or, in an alternate embodiment, it may be at least one of distributed within and attached onto the athlete's uniform. The athlete should carry a receiving antenna near his center of mass both front and back, as well as a receiving antenna on or near his head. The plurality of receiving antennas makes it less likely that measurement data will be lost during play. In a particular embodiment, the navigation receiver continuously updates an inertial navigation unit that is part of the personal motion data collector. The inertial navigation unit comprises accelerometers that measure the motion of the athlete. If the navigation signal is momentarily lost, the inertial navigation unit continues to measure the athlete's motion.

A navigation receiver in the personal motion data collectors of the tracking subsystem 110 converts signals from a plurality of navigation beacons into tracking data 102. The tracking data 102 is then transmitted to receivers off the field. In some embodiments, a transmitter in the personal motion data collector may be a cellular telephone-based transmitter or, in other embodiments, may have a separate dedicated radio or other frequency. For example, infrared transmitters may be used in some embodiments. To improve performance for embodiments using cellular telephone transmitters, a dedicated cellular telephone receiver, located in the stadium, for example, may be included in the tracking subsystem 110.

In embodiments using GPS signals in the tracking data subsystem 110, the receivers may additionally use differential GPS for improved accuracy. Differential GPS uses a fixed local beacon at known coordinates to measure the geometric dilution of precision (GDOP) in the GPS signal, calculate a correction, and broadcast that correction to local GPS receivers, where the correction is added to the GPS receiver result to create a higher-accuracy determination of position and velocity. GDOP is a constantly varying function of the instantaneous geometry of the constantly moving constellation of GPS satellites.

In another embodiment, the tracking subsystem 110 comprises a passive tracking subsystem 110. Passive multi-target tracking is easiest if all targets (here, athletes) have unique signatures. A target's signature is the energy that the target emits and which the passive tracking sensor ultimately receives. In an embodiment of a passive tracking subsystem 110 each athlete should have a unique passive signature. The infrared signature of each athlete's body heat is inadequately unique or constant to allow a passive tracker to discriminate one football player from 21 others during a play. In some passive tracking embodiments, small infrared beacons, each with a unique frequency or pulse repetition rate, can be fixed to each athlete's uniform as signature enhancements to uniquely identify each athlete to a passive tracking sensor. The tracking subsystem 110 comprises a plurality of passive tracking sensors that gather the data for multi-dimensional triangulations. In a particular embodiment, the tracking subsystem 110 may be a software subroutine or object operating in a computer, responsive to the inputs of sensors (which may be configured as peripheral devices) to produce tracking data. Generally, any of the subsystems of the present invention may comprise software subroutines or objects operating in a computer.

In most embodiments, the tracking subsystem 110 receives, decommutates, filters, time tags, sorts, and digitally formats the tracking data 102 from the athletes on the field 104. Decommutation and filtering may be performed in the receiver. Each time tag is generated with the position data from a clock synchronized to a master clock. The time tag may be encoded in any convenient format. Sorting separates the data by athlete identifier and puts the position data in temporal sequence. In some embodiments, sorting will be inherent. For example, if each athlete transmits tracking data over a unique channel, the data arrives sorted by athlete and time. For counter-example, in a passive tracking system, the data may form in the tracking subsystem 110 from all athletes randomly and the data may be temporally scrambled by transmission and processing delays. In some other embodiments, the tracking subsystem 110 creates and digitally formats the tracking data. The digital formatting produces a data stream that is acceptable for processing by the tracking data processing subsystem 120. The time tag is a datum indicating the time at which the tracked athlete was in the position indicated by the time-tagged tracking data 102. The tracking data 102, depending on the tracking subsystem in use, may have very little meaning to a human observer. For example, in a passive tracking system, the tracking data 102 for a given athlete may comprise an athlete identifier, time tag, sensor identifier, and azimuth and elevation angle data in a sensor's local reference frame. The formatted, time-tagged data 112 is sent to the tracking data processing subsystem 120.

In most embodiments, the tracking data processing subsystem 120 converts the athlete tracking data 102 into 4-dimensional data (3 spatial coordinates and time) in a common reference frame and, optionally, also into display coordinates. GPS tracking data 102 is essentially in a common reference frame already and may only require reformatting. In passive tracking embodiments, conversions into a common coordinate system is necessary because the data is originally collected in a sensor's own coordinate system. Without the common reference frame of a common coordinate system, tracking data 102 collected by different passive sensors could not be correlated. Because many available 3-dimensional graphing packages (MATLAB, for example), are easily configured to receive data in a 4-dimensional format, separate conversion into display coordinates will not be required in some embodiments. Athlete motion data 122 comprises the 4-dimensional data in a common reference frame.

In most embodiments, data records containing athlete motion data 122 also contain analyst-entered data 142 describing the date, game, play, and athlete. For example, analyst-entered data 142 may include data describing the height, weight, health, and training level of the athlete. The data 122 and 142 may be collected together in a single data structure. The tracking data subsystem 120 also provides the athlete motion data 122 to a database 130.

In most embodiments, the tracking data subsystem 120 interacts directly with the analyst subsystem 140. The analyst subsystem 140 allows at least one human user (the analyst) to monitor the performance of the tracking subsystem 110 to determine if any sensors, transmitters, or beacons have failed. An analyst can reconfigure the tracking subsystem 120 by selecting redundant elements or turning on spare elements.

The analyst may also select particular athlete motion data 122 being produced in the tracking subsystem 110 to be displayed in real time. "Real time," as defined and used herein, means delayed only by transmission, reception, processing, and display. At least a portion of the data 122 and 164 received by the analyst may be selected for display 144 and sent to the display subsystem 150. The portion sent to the display subsystem 150 may be the portion of the data 122 and 164 that relates to the athletes selected for tracking. In a version of this embodiment, one analyst may be a television commentator who selects particular athletes to track in anticipation of discussing their actions during the play. For example, the analyst may select a wide receiver and a safety to observe their interaction. In an embodiment, the real time display may be saved and replayed. In a variation of this embodiment, the same data can be displayed from the database 130 by instruction from the analyst subsystem 140.

Referring to FIG. 1, the analyst subsystem 140 allows an analyst to add data 146 directly into a data base. For example, an analyst may enter data 146 to create a database file for a game or a player. Athlete motion data 122 may be included in data 146, and stored within the new files. For example, an analyst can input data 146 on the height of an athlete and an athlete's weight at the start of a game. Other athletic performance test data 122 and 146, indicative of the athlete's physical condition at the start of a game, may be entered into an athlete's data record. In a particular embodiment, an analyst may also monitor the status of the database through an analyst subsystem 140. In a particular embodiment, an analyst may enter data 146 specific to an individual play. For example, a data item 146 can be entered identifying the play as a pass play or a running play, or by entering a play book reference. For further example, an item of data 146 may rate the play as a success or failure.

The analyst can receive data 134 directly from the database 130. Typically, data 134 would relate to the status and performance of the database 130. In an alternate embodiment, the analyst subsystem would be able to receive athlete motion data 122 and derived data 162 as part of data 134.

In most embodiments, an analyst's primary interaction should be with the athlete motion analysis processing subsystem 160. The athlete motion analysis processing subsystem 160 responds to queries 149 from the analyst subsystem 140 to provide data 164 regarding the interactions of one or more athletes for whom records are available in the database 130. For example, the analyst using subsystem 140 can query the athlete motion analysis processing subsystem 160 for analysis of a particular wide receiver's acceleration off the line of scrimmage during running plays as compared to passing plays. The purpose of the inquiry may be to determine if the wide receiver is "giving away" the nature of the play too early by accelerating slower on running plays than on passing plays and thereby allowing the defense to respond more quickly. In the example, the athlete motion analysis processing subsystem 160 responds by performing a search in database 130 for all available data on that athlete, sorted according to whether the data is for a running or passing play, and then calculates, from the stored athlete motion data 132, the first and second derivatives of position with respect to time (velocity and acceleration) and compares maximum, minimum, mean, and median accelerations for passing and running plays. The results are formatted into display data 166 and sent to the display subsystem 150. The results may be displayed in a tabular or graphical format. At least a portion of the display subsystem 150 is within view of an analyst.

For a further example, an analyst may make an inquiry 149 to determine how effective a first lineman, while playing a position between particular second and third linemen, is against an opposing fourth lineman who outweighs the first lineman by twenty pounds. The athlete motion analysis processing subsystem 160 will search the database 130 for plays wherein the first lineman played between the second and third lineman in opposing a fourth lineman who outweighs the first lineman by about twenty pounds. The motion of the first athlete will be analyzed along with related data as to success or failure of the play to determine, for example, how long the first lineman was able to keep his opponent within a predetermined distance from the line of scrimmage, or if the first lineman was an offensive lineman, how far he kept his opponent from the quarterback. Statistical measures of the first lineman's performance in the given situation may be displayed in tabular or graphical format. Similar analysis can be performed for a plurality of potential linemen to enable a coach to decide which of his lineman is most appropriate to employ in a given situation. This kind of analysis can be performed before, during, or after a game. The analysis requires that the data 132 from past plays or tests be available.

The athlete motion analysis processing subsystem 160 responds to queries 149 not only by gathering data from the database 130, but also by performing calculations on that data and by formatting the results for transmission to the display subsystem 150. Calculations may involve higher order derivatives of the athlete's change of position with respect to time. For example, the rate of change of acceleration ("jerk") and the rate of change of jerk ("snap") may be calculated. In the context of a football game, a measurable snap term may signify the need for immediate medical attention. Likewise, a derived jerk term beyond predetermined limits can be used to signal a need for medical attention for the athlete measured. A high jerk term corresponds to what commentators often call a "brutal hit" on a football player. Other common and customized statistical results may also be calculated, including means, medians, averages, standard deviations, and correlations.

In most embodiments, athlete motion data is collected for every player on every play. An analyst may use the analyst subsystem 140 to determine what derived data 164 and data representations 166 will be provided for the next play from the athlete motion analysis processing subsystem 160. The athlete motion analysis processing subsystem 160 is also capable of post-processing athlete motion data to derive more data 164 and data representations 166 than can be processed in near real time during a game. The processing limits for near real-time data will, as always, depend upon the data handling capabilities of the particular computers employed.

In a particular embodiment, the athlete motion analysis processing subsystem 160 comprises an executive component, a data base search engine, and a data analysis component. The executive component receives analyst queries 149, executes any necessary database queries 162 by tasking the database search engine, tasks the data analysis component to perform any necessary calculations on data retrieved from the database, and organizes the results for the display subsystem 150. In another embodiment, the executive component assists the analyst in forming an analyst query 149 using a graphical user interface. In yet another embodiment, complex queries 149 are stored in at least one of the analyst subsystem 140 and the athlete motion analysis processing subsystem 160 and can be recalled and executed as more data 132 becomes available.

The data analysis component of the athlete motion analysis processing subsystem 160 comprises computer programs to calculate derived data 164. For example, velocity is calculated from a change in position divided by time. Acceleration is calculated from a change in velocity divided by time. Likewise, a wide variety of statistical tools may be included in the data analysis component. For example, an athlete's mean acceleration off the scrimmage line may be calculated. Likewise, the probability of an athlete's response to a specific combination of motions of a subset of his opponents may be calculated. Correlations between an athlete's initial direction of acceleration and success of a particular play can be calculated and examined. Correlations between a linebacker's initial motion and the initial motion of each offensive player over many plays may be used to determine which of the offensive players the linebacker initially keys on. Analysis results are collectively referred to as derived data 164. At least a portion of derived data 162 may be stored in the database 130.

The display subsystem 150 comprises at least one video screen for displaying tabular, graphical, and video data representations 166. The video screen may be, for example, a computer display terminal or a television set. A given data representation 166 may be displayed alone or with other data representations or video data representations 166. Multiple data representations 166 may be tiled or overlaid for comparison.

In an embodiment, portions of the display subsystem 150 and analyst subsystem 140 may be combined in a touch-screen monitor. In this embodiment, the tracking system 110 locates each player and produces track data 102 on the initial location of each player. The display system 150 generates an icon, superimposed over each player's video image in a video image of the occupied playing field 104. An icon is a graphical data representation 166. By touching one or more particular icons 166 on the screen with a finger or light pen, as are known in the art, the analyst selects one or more athletes for further tracking. The analyst may associate the athletes selected for tracking with derived data 164 categories on a menu or other graphical user interface, in order to instruct the computer to generate the associated derived data 164 products for the selected athletes.

The connectivity of the components and subsystems may be intranet connectivity. For example, the analyst subsystem 140 may comprise a personal computer connected to a second personal computer which contains the tracking data processing subsystem 120 and also connected to a server that contains the database 130 and database search engine. In a simpler version of the embodiment, the athlete motion processing subsystem 160 may be within the same computer as the analyst subsystem 140. The display subsystem 150 may comprise a graphics workstation or a personal computer (with a monitor) connected to the server. A more complex embodiment may have a plurality of servers for each group of system users. For example, the two teams of athletes, the officials, the television commentators, and a plurality of subsets of sports fans would each be a group of system users. Specific devices in the tracking subsystem, such as athlete tracking data 110 receivers, may be configured and connected as computer peripheral devices using Universal Serial Bus (USB) technology.

Further connectivity may be provided on the internet. Terminals with limited access to data 164 and 166 may be placed in sports bars inside or outside of a stadium so that fans can request tracking of certain athletes on the next play, and each of many such terminals may be simultaneously tracking a different combination of athletes on that next play. A tracking request comprises data 148 in a structure further comprising a message. A home computer may serve as an analyst subsystem 140 and a display subsystem 150, wherein a sports fan at home may request athlete motion data 122, 144, and data representations 166 during the game. In a version of this embodiment, the home computer and television are integrated to provide a televison display of the play with athlete motion data 122 representations superimposed. For example, icons 166 of velocity and acceleration vectors may be dynamically superimposed on the television image of the field 104 at the athletes' feet for the amusement of the home sports fan. Note that icons comprise data, a structure for that data, and the screen image created by the computer in responding to that data.

In another embodiment, fictional data may be entered into the database 130 for the purpose of performing "what if" analysis. For example, a coach may wish to see the effects of his team being two percent faster (velocity) and quicker (acceleration). Copies of existing athlete motion data can be modified to create a fictional, faster team. Athlete motion data 122 for an opposing team may be analyzed to develop a model of how the opposing team reacts to the motions of its adversaries. The fictional, faster team can then be simulated in plays against the model of the recorded opponent. A similar analysis can be done for increases in strength and weight. The results may be compared to determine what training strategy would be most advantageous against a given opponent.

Figure 2:
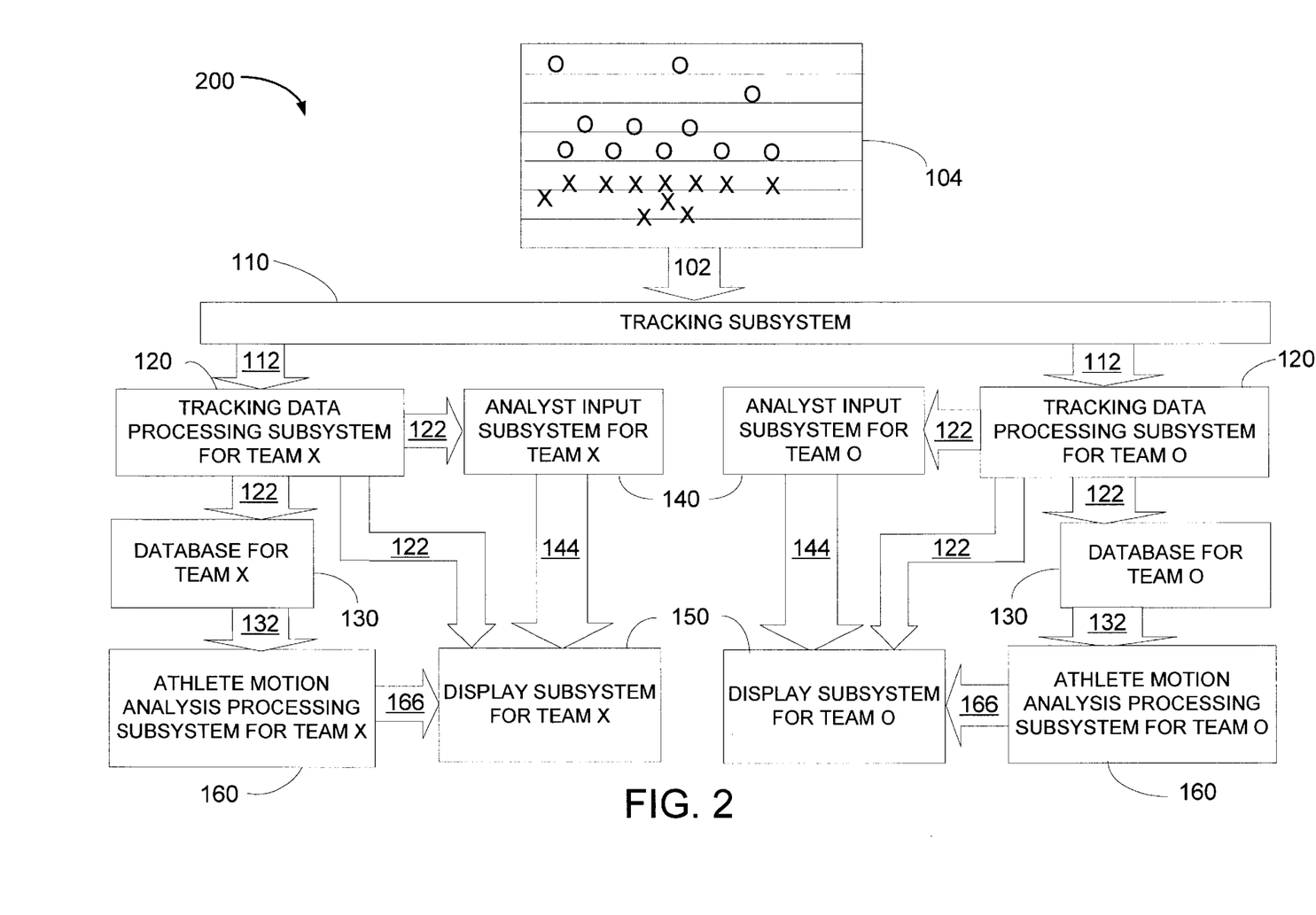
FIG. 2 is a system diagram of another embodiment of the competitive athlete tracker.

FIG. 2 shows an exemplary embodiment of a competitive athlete evaluator 200 wherein inputs from at least one analyst subsystem 140 for a first team and athlete motion analysis processing subsystem 160 outputs describing the first team cannot accessed through the at least one analyst subsystem 140 for another team. For example, an analyst for a first team may input data about the injury status of an athlete on the first team and not want any analyst for a second team to have access to that data. The embodiment of FIG. 2 comprises the same data as the embodiment of FIG. 1, although data 134, 142, 146, 148, 149, 162, and 164 are not shown in FIG. 2. The embodiment of FIG. 2 permits opposing teams access to all athlete tracking data 112 but not analyst-entered data 142, 144, 146, 148, and query 149. Furthermore, the embodiment of FIG. 2 allows outputs of data 164 and data representations 166, which have been derived by the athlete motion analysis processing subsystem 160 from, among other things, analyst-entered data 142 and 148, to be seen only by the team whose analyst entered the data 142 and 148. The discussion regarding FIG. 1 otherwise applies to the embodiment 200 in FIG. 2.

Figure 3:
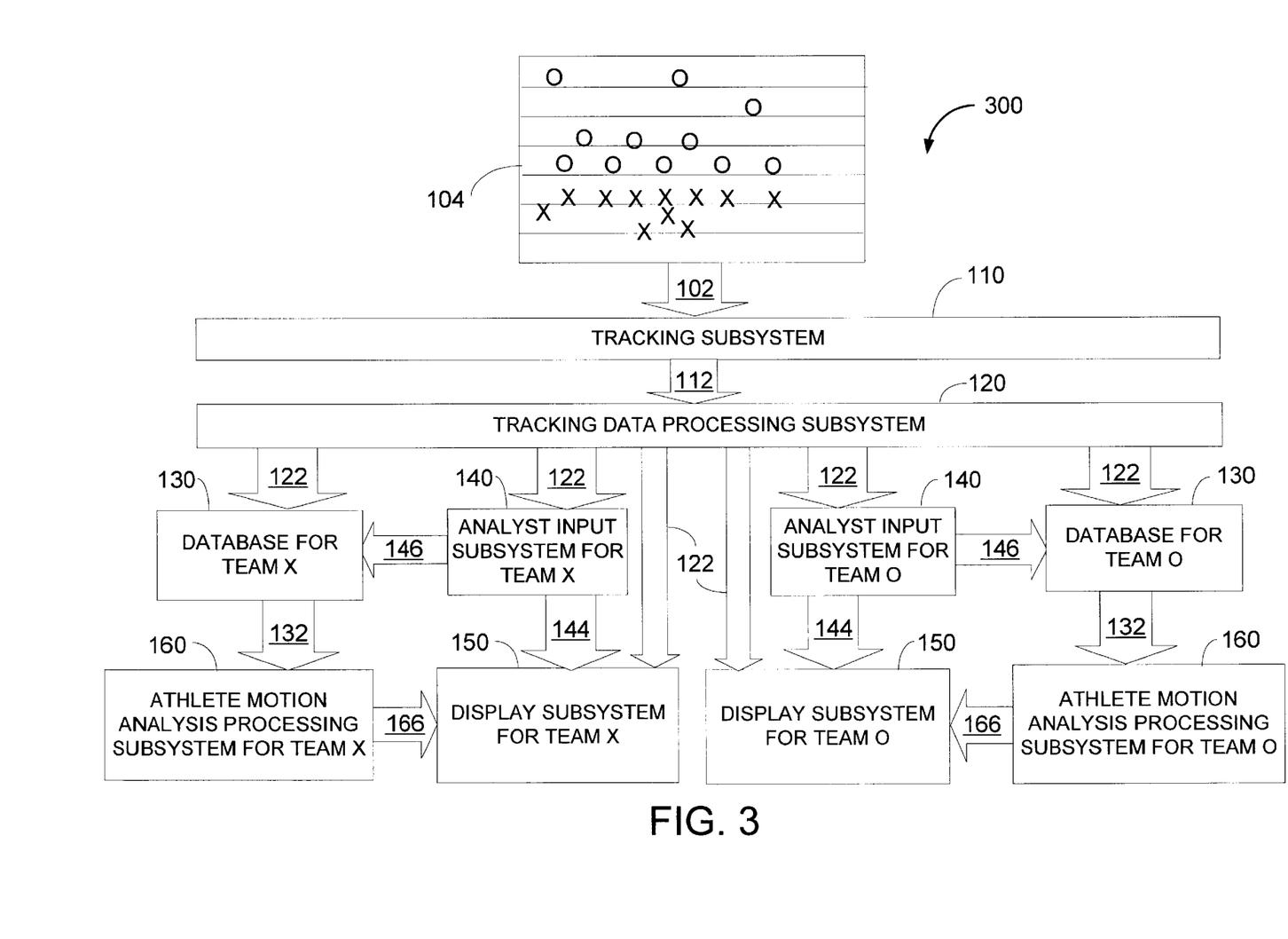
FIG. 3 is a system diagram of another embodiment of the competitive athlete tracker.

FIG. 3 shows an exemplary embodiment of a competitive athlete evaluator 300 wherein the outputs of the analyst subsystem 140 are limited to outputs to an access-limited database 130, an access-limited athlete motion analysis processing subsystem 160, and an access-limited display subsystem 150. The embodiment of FIG. 3 comprises the same data and query as the embodiment of FIG. 1, although data 134, 142, 146, 148, 149, 162, and 164 and query 149 are not shown in FIG. 3. The embodiment of FIG. 3 permits opposing teams access to all athlete motion data 122 but not analyst-entered data 142, 144, 146, 148, or query 149. The discussion regarding FIG. 1 otherwise applies to the embodiment 300 in FIG. 3.

Figure 4:
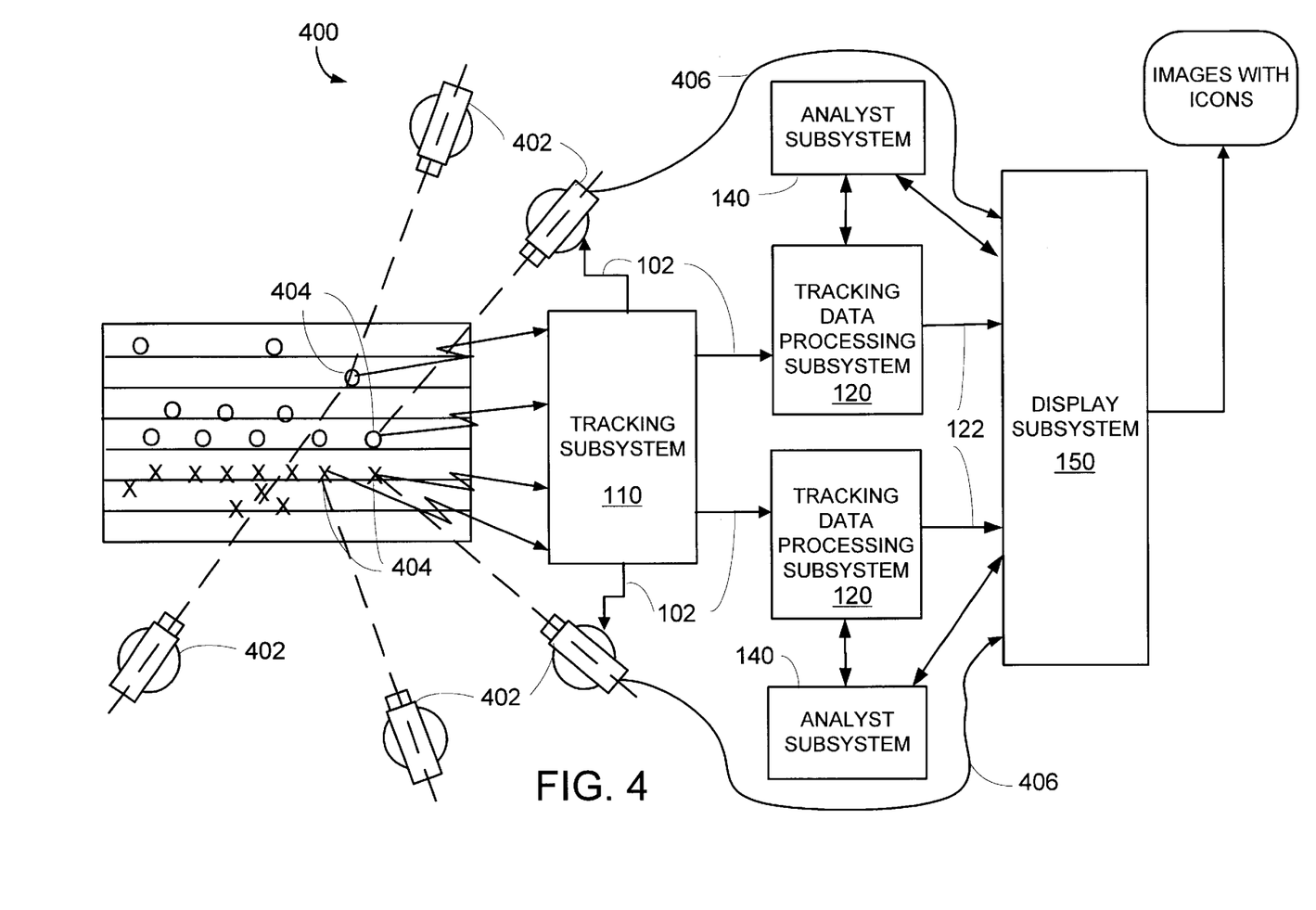
FIG. 4 is a system diagram of an embodiment of a portion of a competitive athlete tracker.

Referring to FIG. 4, in exemplary embodiment 400, the real-time tracking data 102 may be used to control at least one video camera 402 to photograph selected athletes 404 as they move. For example, a commentator may select an offensive tackle, a wide receiver and several members of the defensive backfield for tracking. During the next play, the selected athletes would be tracked by video cameras 402 at the same time that their motion was being tracked by the tracking subsystem 110. The time lag between the tracking data generation and the camera tracking can be compensated for in the display system.

In a particular embodiment, the video image data 406 and the athlete motion data 122 may be displayed side by side. In another embodiment, icons representing data derived from the athlete motion data 122 may be superimposed on the video image 406. For example, three-dimensional velocity and acceleration vectors, iconified as arrows of different colors, could be superimposed on each tracked athlete's video image. For another example, a two-dimensional graph of the athletes' velocity and acceleration could be displayed, with the data being graphed dynamically as the video of the play is presented. Methods of superimposing computer-generated images on video images are known in the art. For example, a computer-generated first-down marker is routinely displayed on televised football broadcasts, using a video-image-icon coordination system called "1$^{st}$ and Ten™," developed by Sportvision. The marker is a computer generated icon that is superimposed on the video image of the field (but, cleverly, not over the players on that field) ten yards from the original line of scrimmage. The icon appears as a bright yellow line extending across the field of play. When players or officials walk across the marker icon, the marker icon is obscured by the player's image, just as if the marker icon was actually on the ground and the players and officials were walking over it. Thus, coordination of moving video images of players with a computer generated icon is known. The "1$^{st}$ and Ten™" does not provide moving icons with moving images.

Figure 5:
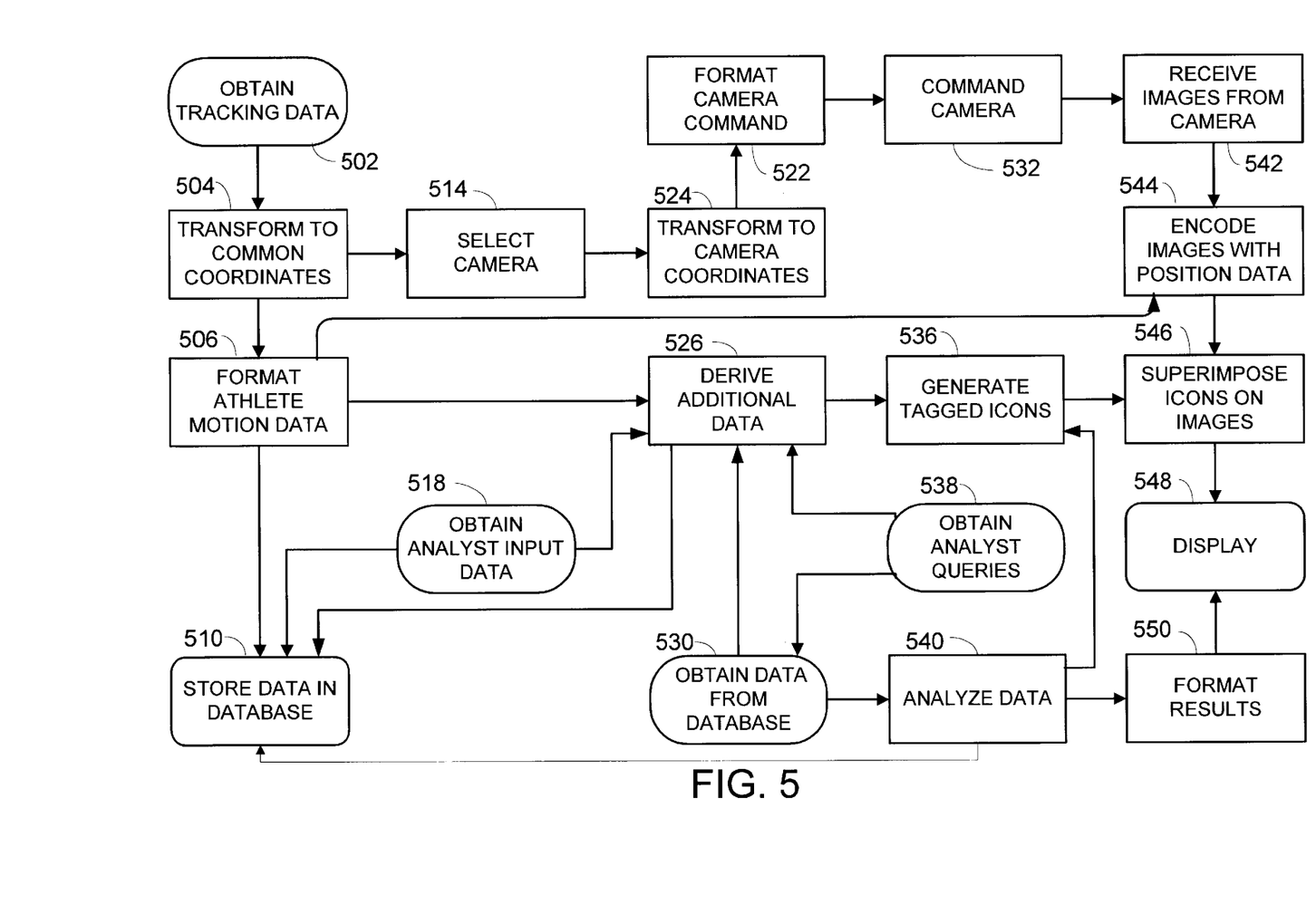
FIG. 5 is a system diagram of an embodiment of a portion of a competitive athlete tracker.

FIG. 5 shows an example of the steps of an exemplary embodiment of the method of tracking athletes in competition. Steps that involve acquisition of data are shown in boxes with rounded ends. Steps wherein data reaches a final destination are shown as boxes with rounded corners. Square-cornered boxes show intermediate steps. The following discussion will be from the perspective of tracking a single athlete, with the understanding that a plurality of such athletes may be being tracked simultaneously.

The process begins at step 502 where tracking data 112 (FIG. 1) is obtained. Tracking data 112 (FIG. 1) includes three-dimensional position, the time that the athlete was at that position, and an athlete identifier. In a particular embodiment, step 502 comprises collecting transmissions from personal motion data collectors. In an alternate embodiment, step 502 comprises passively sensing the athletes. Step 502 is implemented by the tracking subsystem 110 (FIG. 1).

Tracking data 112 (FIG. 1) is converted in step 504 to common coordinates, which are the coordinates of a common reference frame. Depending on the tracking system in use, the original tracking data 102 (FIG. 1) may be produced in the various reference frames of the various tracking sensors. By converting all tracking data 102 (FIG. 1) coordinates into a single, common, reference frame, the interactions of different athletes tracked by different sensors may be evaluated together. GPS coordinates, for a counter-example, are created in a common inertial reference frame. Unless there is some compelling operational reason to change coordinates to a set referenced to the playing field, step 504 may be skipped for embodiments using GPS tracking data 102 (FIG. 1). Step 504 is implemented by the tracking data processing subsystem 120 (FIG. 1).

The initial position of the tracked athlete is used to select at least one digital video camera from among a plurality of digital video cameras in step 514. The camera selection process may, for example, select a camera nearest the athlete to be tracked. Other criteria may be used. For example, a camera which is most directly behind the athlete to be tracked may be selected. For another example, one camera offering a view from a defensive team's perspective and another camera offering a view from an offensive team's perspective may be selected. A prioritization scheme may be implemented to resolve resource conflicts when one camera might be selected for two different tracking assignments. Step 514 is implemented in the tracking data processing subsystem 120 (FIG. 1).

In step 524, the common coordinates of the tracked athlete's position are transformed into the selected camera's local coordinate system. The transformed coordinates comprise the point towards which the camera should look. The position of each camera is known a priori, so the azimuth and elevation angles to which the camera should point, as well as the focal range, can be determined from knowledge of the tracked athlete's position in the camera's local reference coordinate system. Step 524 is implemented in the tracking data processing subsystem 120 (FIG. 1).

Step 522 formats the command to slew the camera to track the athlete and adjust zoom and focus. For some athletes, the zoom may be tight and for others the zoom may be wider. For example, when tracking a wide receiver, the zoom may be specified as tight, to substantially fill the frame with the wide receiver's image. For another example, when tracking a lineman, the zoom may be wider to show the tracked lineman and the linemen on either side. In a particular embodiment, an indicator of the desired zoom may be stored in a database 130 via a step 510. In another embodiment, the zoom indicator may be a function of the athlete identifier. For example, if the athlete's jersey number is the athlete identifier, then the higher the jersey number, the wider the zoom. Step 522 is adapted to the particular hardware that moves the camera. Step 522 is implemented in the tracking data processing subsystem 120 (FIG. 1).

Step 542 receives digital video images as a temporal sequence of digital video frames, each comprising a pixel map with the characteristics of each pixel encoded therein. Each digital frame is also encoded with the time it was taken and an athlete identifier. Optionally, each frame may be further encoded with the location of the tracked athlete in camera-local coordinates. The encoding may be in a larger data structure that also includes the digital frame or it may be in the digital frame itself. Step 542 is implemented in the display subsystem 150.

Step 544 encodes each digital frame with the tracked athlete's position data in common coordinates as of the time the digital frame was taken. Thus, at the end of step 544, for each athlete tracked, there exists a digital image frame from a selected camera which is encoded with the tracked athlete's unique identifier, the time the image was created, and the three-dimensional position of the tracked athlete, expressed in common coordinates, showing the athlete at the time encoded on the frame. In most embodiments, each digital image frame is also encoded with data showing the camera's position, orientation, and focal data, including zoom and focus settings. Step 544 is implemented in the display subsystem 150.

Step 506 formats the athlete tracking data into athlete motion data 122 (FIG. 1). Athlete motion data comprises the time the tracking data was created and the tracked athlete's three-dimensional position information in common coordinates. The time and position data are used to encode the digital video frames in step 544. The time and position data are also used to queue the derivation of additional data in step 526. The formatted athlete motion data is also sent to the database 130 (FIG. 1). Step 506 is implemented in the tracking data processing subsystem 120.

Step 518 collects and formats data from analysts. The data collected may include data about the athlete (mass, fitness indicators, height, etc.), the play (pass, run, play book number, success or failure, etc.), and the game (opponent, date, time, type of field, field conditions, etc.). Step 518 is implemented in the analyst subsystem 140.

Step 526 derives additional data from which, among other things, icons may be generated. Each set of position coordinates and its associated time comprise a measurement. To derive velocity, two measurements are needed. The difference in position is divided by the difference in time to calculate an estimate of velocity. The greater the accuracy desired, the closer together in time the measurements must occur. To derive acceleration, three measurements are needed. Four measurements are needed to derive jerk and five measurements are needed to derive snap. The frequency of measurements should be higher than the frequency of video image frame rates. Only in this way can higher order derivatives be associated with a particular digital image frame. Step 526 includes the calculation of any quantity that is derived directly from the athlete's motion (position as a function of time). For example, reaction time, measured as the time of first motion of the tracked athlete after the play starts, may be derived. Step 526 uses data stored in the database 130 in step 510 and also sends data to be stored in the database 130 in step 510. For example, the momentum of an athlete may be calculated from velocity (derived from two positions and time) and mass (stored in the database 130 in step 510), and that momentum may be stored in the database 130 in step 510. Step 526 is implemented in the athlete motion analysis processing subsystem 160.

Step 510 stores the data created in steps 506, 516, and 526 in persistent storage. In embodiments with distributed database systems wherein some data is more easily accessible than other data, data on athletes currently being tracked is maintained as the most easily accessible. In an embodiment, the database is a relational database. Step 510 is implemented in the database 130.

Step 538 obtains the information which determines what analysis will be performed in a step 540 and what data is to be obtained from the data base 130 in a step 530 for use in a step 540. Queries include, among other things, tracking instructions (athlete selection, derived data products desired for display, derived data products for storage, etc.). The queries of step 538 may concern more than one athlete. For example, step 538 may form a query to track gaps in the offensive line by tracking the linemen and defining a plurality of line segments between them. Athlete motion data on the offensive linemen would then be obtained form the database 130 in step 530 and analyzed in step 540 to define the queried-for plurality of line segments. The plurality of line segments would be passed to step 536 which would generate line segment icons. Those icons would be superimposed on the video images in step 546 to dynamically highlight the gaps in the offensive line. Step 538 provides information to step 526 regarding what data to derive for particular athletes. Analyst queries are generated in the analyst subsystem 140 and are obtained by the athlete motion analysis processing subsystem 160 in step 538.

Step 530 obtains data from the database 130 (FIG. 1) for producing derived data in step 526 and for data analysis in step 540. Data originally entered by an analyst is obtained from the database in step 530 and combined with athlete motion data in step 526. Data may be obtained from the database 130 by query from the athlete motion analysis processing subsystem 160 in step 538.

Step 536 generates icons which will be superimposed on video images in step 546. Icons are generated as pixel maps, in which the pixels comprising the icon contain data defining their color and other properties. In most embodiments, the pixel map of the icon will be addressed in the same way that the pixel map of the video image frame of the athlete is addressed.

The variety of possible icons that can be produced is as large as the different kinds of data that the invention can produce. For a simple example, an icon representing the athlete's velocity may be created as an image of an arrow with a length proportional to the magnitude of the velocity, having a pointed end and a base end. The arrow points from a location near the tracked athlete in the direction of the velocity. The icon is correlated with the image of the athlete. Correlation is done using athlete motion data to locate the athlete in four dimensions (three positional coordinates and time) and to create an image of the icon as it would be seen from the camera taking the video images of the athlete if the icon was at the same coordinates as the athlete. In a variation of this embodiment, the tracked athlete's coordinates are those of his center of mass and the icon image is shifted downward by the distance from the athlete's center of mass to the ground in order to "paint" the icon on the field. In other variations of this embodiment, The icon is shifted upward to the level of the athlete's head or rearward and downward, so the icon is "painted" on the field behind and pointing towards the athlete.

Step 540 analyzes data in response to the queries obtained in step 538. Step 540 produces analytical data products. Some analytical data products may be appropriate for icon generation, and may be sent to step 536 for that purpose. Other analytical data products may be displayed in tabular or graphical format, and may be processed in step 550 for that purpose. Step 540 analyzes data obtained from the data base 130. Step 540 is implemented in athlete motion analysis processing subsystem 160.

Step 548 may display video images with icons superimposed or step 548 may display formatted analytical data products, or both may be displayed, on one or more video screens. Step 548 may involve displaying images on a plurality of video screens of different types. For example, some video screens may be monitors on home computers, while others may be specialized graphics terminals such as those made by Silicon Graphics.

Figure 6:
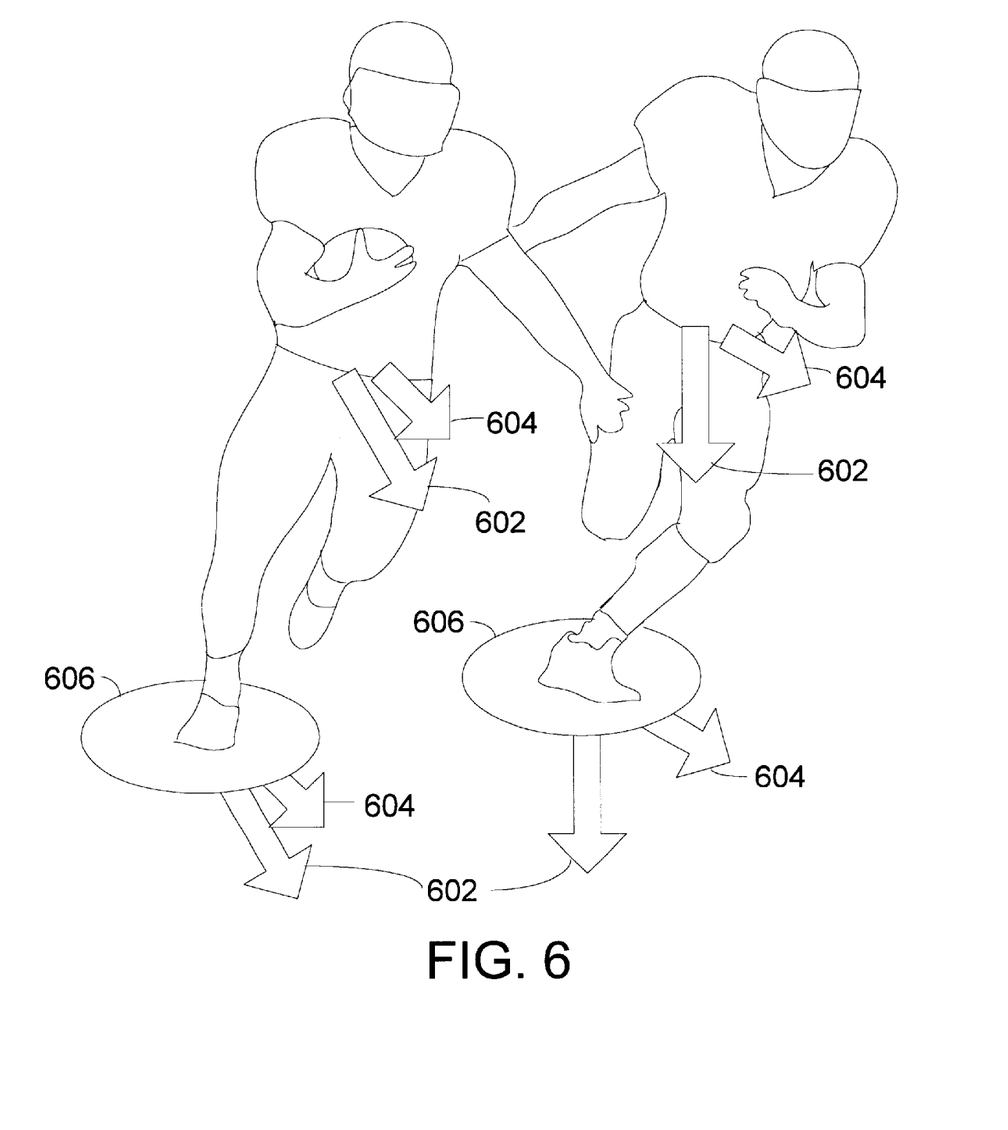
FIG. 6 is an exemplary view of displays of an embodiment of a competitive athlete tracker.

FIG. 6 shows two alternate approaches to displaying digital graphical icons with video images. The drawings of the athletes represent their digital video images. Velocity vector icon 602 and acceleration vector 604 are shown as extending from an iconic base 606 which is drawn beneath the athlete's image and shown alternately extending from the image of the athlete's waist. The vector icons 602 and 604 are exemplary, and may be used to represent a variety of quantities having direction and magnitude. The vectors may extend from any point on the athlete's image or from points near the athlete's image. For example, the vector icons 602 and 604 may extend from a point directly above the image of the athlete's head. The vector icons 602 and 604 may be updated as often as once every video frame, so the icons will appear to the viewer to change size and orientation and to move as the athlete moves. Iconic base 606 may include the athlete's jersey number. The moving icons may be replayed without the video images of the athletes. The icons 602 and 604 may be drawn in different colors, textures, shapes or patterns to uniquely identify each vector.

Figure 7:
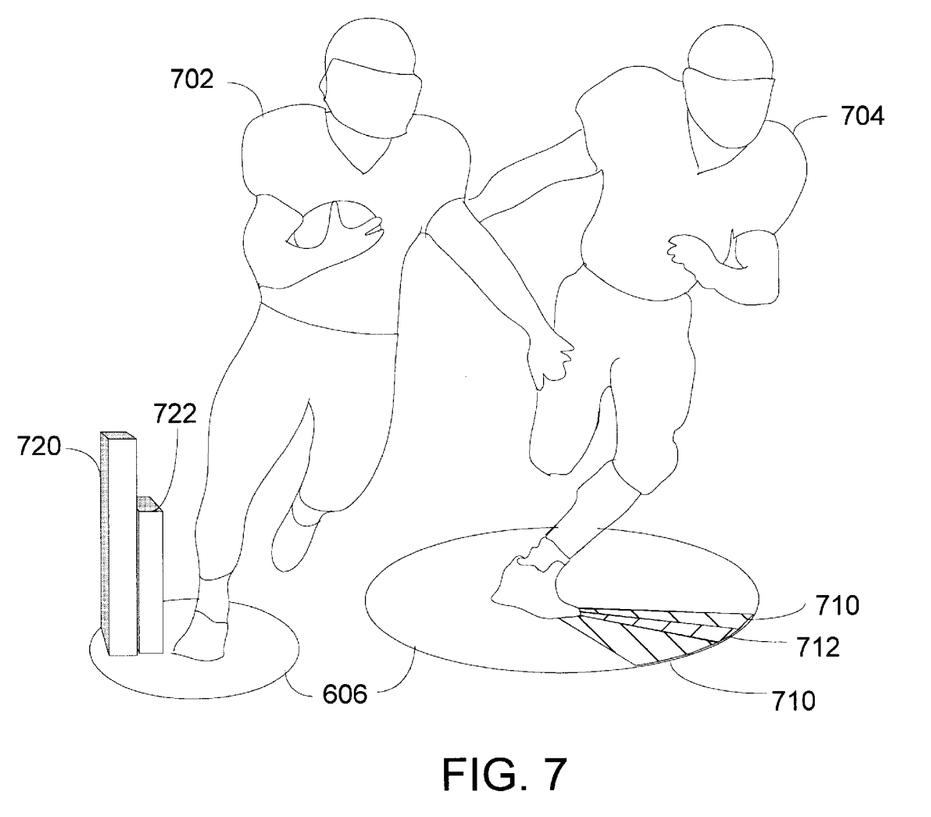
FIG. 7 is an exemplary view of displays of an embodiment of a competitive athlete tracker.

FIG. 7 shows two additional alternate approaches to displaying digital graphical icons with video images of athletes. The drawings of the athletes represent their digital video images. Drawn under the image of the first athlete 702 is an iconic base 606. Extending upwardly from the base are a plurality (two are shown in FIG. 7), three-dimensional bar graph icons 720 and 722, indicative of some quantities of interest. For example, one bar may represent kinetic energy and another may represent the magnitude of momentum. Drawn under the image of the second athlete 704 is an iconic base 606. The iconic base 606 is used as a variation of a pie chart. Slice 710 indicates the magnitude of a directed quantity by its base angle. For example, for velocity, the centerline of the slice 710 is co-linear with the direction of motion and widens as speed increases. Acceleration, iconified as slice 712, may be displayed the same way. The smaller slice 712 may be overlaid upon the larger slice 710, as shown.

While the invention has been described in terms of its applicability to the sport of football, it will be clear to those of ordinary skill in the art how to apply it to other team sports. Portions of the invention may also be used for individual sports. Likewise, while the description has focused on athletes, it will be obvious to those of ordinary skill in the art to apply the invention to sports officials, the football itself or other play piece, and to non-sport events such as military training, police activities, or crowd control.

The foregoing description has described selected embodiments of methods and apparatuses for evaluating athletes in competition.

While the invention has been particularly shown and described with reference to selected embodiments thereof, it will be readily understood by one of ordinary skill in the art that, as limited only by the appended claims, various changes in form and details may be made therein without departing from the spirit and scope of the invention.

I claim:

1. A method for manipulating data for evaluating performance in athletic competition, the method comprising the steps of:

tracking a plurality of athletes to produce athlete tracking data for each tracked athlete;

processing the athlete tracking data for each tracked athlete to produce athlete motion data;

controlling a plurality of digital video cameras, responsive to at least one of the athlete tracking data and the athlete motion data, to record digital images of at least a portion of the tracked athletes in motion, the images for each recorded, tracked, athlete comprising a temporally ordered, time-tagged, sequence of digital image frames;

generating at least one graphical icon representing at least one of the athlete motion data and data derived from the athlete motion data for each athlete tracked;

correlating the recorded digital image frames for each tracked, recorded athlete with at least one graphical icon for that tracked, recorded athlete;

superimposing the at least one graphical icon at least one of on and near the image of the at least one athlete whose motion is represented by the at least one icon; and displaying the superimposed images.

2. The method of claim 1 wherein the step of tracking a plurality of athletes comprises the steps of:

creating the athlete tracking data in at least one personal motion data collector moving with each tracked athlete, the athlete tracking data comprising:

up to three position coordinates;

a time-tag indicating the time at which the athlete was at the position indicated by the coordinates; and a unique identifier for each athlete;

transmitting the athlete tracking data from at least one transmitter in the at least one personal motion data collector, the transmitter responsive to the creation of the athlete tracking data to transmit the athlete tracking data; and receiving the transmitted athlete tracking data in at least one receiver coupled to at least one data processor.

3. The method of claim 1 wherein the step of tracking a plurality of athletes comprises the steps of:

passively tracking each of a plurality of athletes' uniforms to produce athlete tracking data, the uniforms configured to be cooperatively tracked, one uniform moving with each athlete tracked;

determining the athlete tracking data for each athlete from the passive tracking data in at least one processor located off the field of play, the athlete tracking data comprising:

at least one position coordinate;
a time-tag indicating the time at which the athlete was at the position; and
a unique identifier for each athlete; and
sorting the athlete tracking data.

4. The method of claim 1 wherein the step of processing the athlete tracking data comprises the steps of:
converting the at least one position coordinate for each athlete tracked from a tracking system reference frame into a common inertial reference frame;
receiving analyst input data;
forming a data structure containing the transformed position coordinates, time-tags, identifiers, and analyst input data; and
providing access to the data structure for at least one of storage, analysis, and display.

5. The method of claim 1 wherein the step of generating at least one digital graphical icon comprises:
creating a digital graphical icon comprising at least one of:
a vector representation of at least one parameter of the athlete's motion;
an iconic base;
the numeral from the tracked athlete's uniform;
a bar graph representation of at least one parameter of the athlete's motion; and
a line graph representation of at least one parameter of the athlete's motion; and
storing the graphical icon in a data structure.

6. The method of claim 1 wherein the step of correlating further comprises the steps of:
encoding each digital image frame with camera position, orientation, and focal data at the time the digital image frame was recorded;
encoding each digital image frame with an item of the athlete motion data for a tracked athlete whose image is recorded in that digital image frame, wherein a time element of the athlete motion datum and a time-tag of the digital image frame differ by no more than a predetermined tolerance;
encoding an athlete motion datum in a data structure, the data structure containing the digital graphical icon representing at least one of the athlete motion data and data derived from the athlete motion data;
comparing the encoding in the digital image frame to the encoding in the digital graphical icon data structure to identify matched sets, wherein a matching set comprises a digital image frame and a digital graphical icon having the same encoding;
storing each matched set of a digital image frame and a digital graphical icon in a data structure;
transforming an icon, wherein the image of the icon is transformed into a perspective of the digital video camera that recorded the digital image frame having matching encoding, as if the icon was located at the coordinates of the athlete at the time the athlete was there; and
storing each matched set of a digital image frame and a transformed digital graphical icon in a data structure.

7. The method of claim 1 wherein the step of superimposing comprises the steps of:
determining which pixels in the digital image frame correspond to pixels of a digital graphical icon; and
changing a portion of the pixels of the digital image frame to a color selected for the icon.

8. The method of claim 7 wherein the step of changing comprises at least one of:
changing to a color selected for the icon only those digital image frame pixels representing both the icon and the field of play;
changing to a color selected for the icon all digital image frame pixels representing the icon; and
changing to a color selected for the icon all digital image frame pixels representing the playing field, the icon, and not the tracked athlete.

9. A system for evaluating athletes comprising:
at least one athlete tracking subsystem, operative to simultaneously collect tracking data on a plurality of athletes;
at least one tracking data processing subsystem, operative to process the tracking data to produce athlete motion data;
at least one analyst subsystem, operative to allow at least one analyst to input data to the system;
at least one database, operable to store and retrieve data records comprising at least one of the athlete tracking data, the athlete motion data, derived data, and the analyst-input data;
at least one athlete motion analysis processing subsystem, operative to process the data records, and responsive to the analyst inputs to provide derived data; and
at least one display subsystem, operative to visually display at least one of:
at least one of the data records;
at least one graphical representation of the at least one of the data records;
video data associated with the at least one of the data records; and system status and configuration.

10. The system of claim 9, wherein the athlete tracking subsystem comprises a cooperative tracking subsystem.

11. The system of claim 10, wherein each of the plurality of athletes wears a uniform, the uniform comprising a personal motion data collector.

12. The system of claim 11, wherein a personal motion data collector comprises a navigation receiver and a data transmitter.

13. The system of claim 12, wherein the navigation data receiver is a Global Positioning System receiver.

14. The system of claim 9, wherein the at least one database is a plurality of databases, at least one of which is configured to be inaccessible to at least one group of system users.

15. The system of claim 9, wherein the tracking data processing subsystem comprises:
at least one receiver, the receiver accepting the athlete tracking data in sensor coordinates and responsive to produce the athlete tracking data formatted for a processor;
at least one processor, the processor responsive to the input of the athlete tracking data in sensor coordinates to:
produce the athlete motion data in common coordinates;
accept the analyst input data; and
combine the athlete motion data in common coordinates and the analyst input data into at least one athlete motion data record; and
at least one communications link, the communications link operative to send the at least one athlete motion data record to at least one of storage, analysis and display.

16. The system of claim 9, wherein the at least one analyst subsystem further comprises a subsystem responsive to the analyst input to reconfigure the tracking data subsystem.

17. The system of claim 9, wherein the at least one analyst subsystem is a plurality of analyst subsystems, at least one of which provides data to a database that is inaccessible to at least one group of system users.

18. The system of claim 9, wherein the at least one analyst subsystem further comprises a subsystem operative to select athletes for tracking.

19. The system of claim 9, wherein the at least one analyst subsystem further comprises a subsystem operative to perform analysis of stored athlete motion data and derived data.

20. The system of claim 9, wherein the at least one display subsystem is a plurality of display systems, at least one of which provides displays at least one of that is inaccessible to at least one opposing team.

21. The system of claim 9, further comprising at least one digital video camera, the digital video further comprising a camera controller, the camera controller responsive to at least one of the athlete tracking data and the athlete motion data to maintain an athlete being tracked within the field of view of the digital video camera.

22. The system of claim 21 wherein the at least one display subsystem comprises at least one screen displaying both digital video images and graphical representations of at least one of the athlete motion data and the derived data.

23. The system of claim 22 wherein the at least one of the athlete motion data and the derived data is displayed as graphical icons superimposed on the digital video images.

24. The system of claim 22 wherein the data is displayed exclusively in a first area of the screen and the digital video image is displayed exclusively in a second area of the screen.

25. The system of claim 9, wherein non-athletes are tracked, the non-athlete comprising at least one of a ball and an official.

26. The system of claim 9, wherein athletes comprise a plurality of persons engaging in a physical activity within a defined space.

27. An apparatus for evaluating athletes, the apparatus having an athlete motion analysis processing subsystem comprising:

a first software component, responsive to a query, operative to obtain and correlate data for a plurality of athletes;

a second software component, responsive to the correlated data for the plurality of athletes, operative to calculate derived data from at least one of athlete motion data, stored derived data, and analyst input data; and a third software component, operative to evaluate the calculated derived data and to format the results for at least one of storage, analysis, and display.

28. A method for displaying a graphical icon correlated with a video image of an athlete, the method comprising:

collecting tracking data of the athlete's motion;

controlling a digital video camera to maintain the athlete in a field of view of the digital video camera;

recording a digital video image of the athlete in motion;

generating a data structure, data, and an image for an icon in a computer, wherein:

the icon represents a feature of the athlete's motion; and the image of the icon is created in a perspective of the digital video camera that recorded the video image, as if the icon was located near the coordinates of the athlete at the time the athlete was there; and superimposing the image of the icon onto the recorded video image.

29. The method of claim 28 wherein the step of controlling a digital video camera comprises the steps of:

optically tracking the athlete; and recording the position, orientation, and focal data of the camera on at least one recorded video frame.

30. The method of claim 29 wherein the step of recording camera data on at least one recorded video frame comprises recording camera data on each frame recorded immediately after a change in camera position, orientation, or focal data.

31. The method of claim 28 wherein the step of controlling a digital video camera comprises the steps of:

transforming athlete tracking data into camera coordinates;

formatting a camera command from the transformed tracking data, the command operative to move the camera to view the athlete being tracked; and recording the position, orientation, and focal data of the camera on each recorded video frame.

* * * * *